Figure 1:
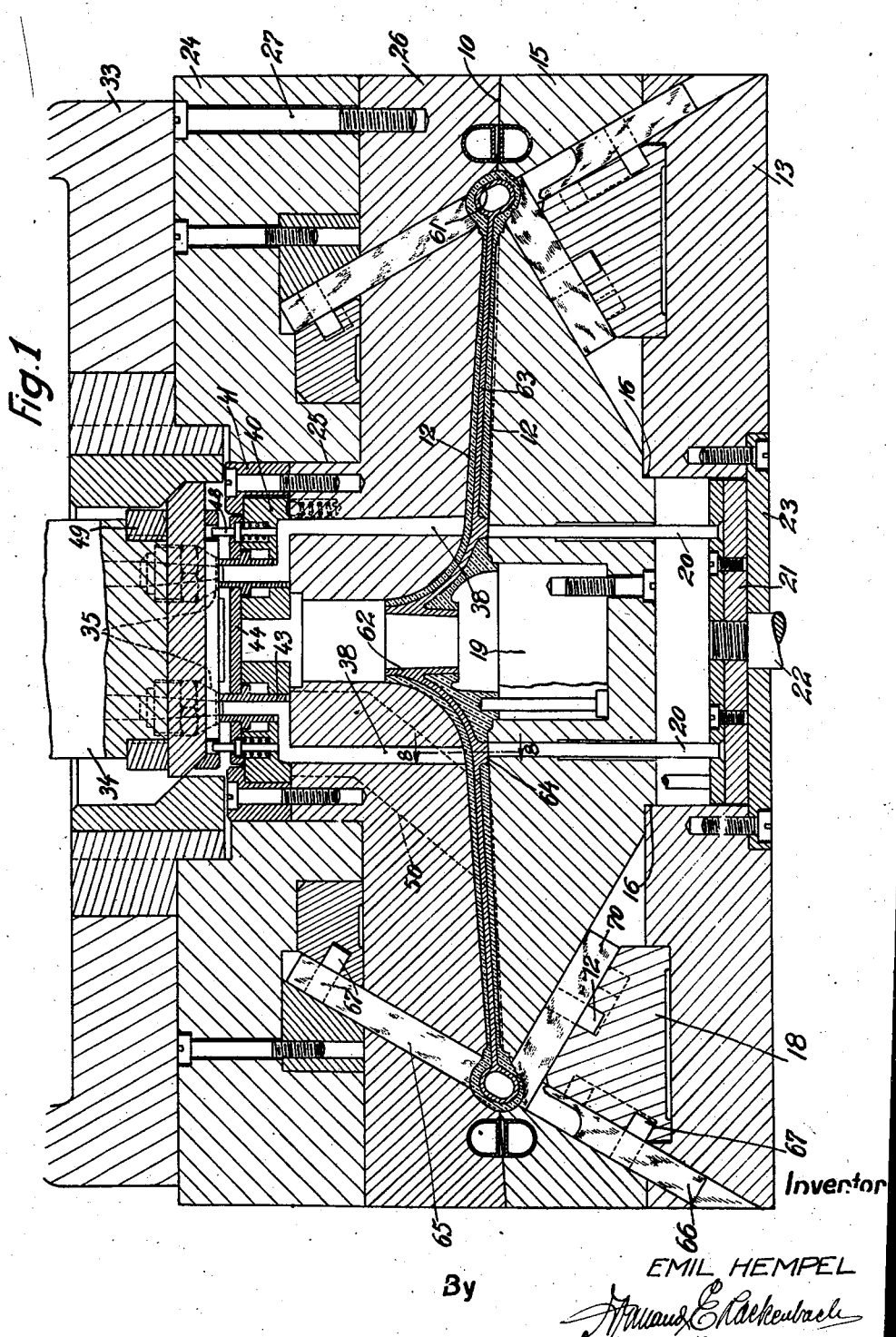

Aug. 22, 1944.　　　　E. HEMPEL　　　　2,356,585
INJECTION MOLD
Filed Dec. 3, 1940　　　　6 Sheets-Sheet 3

Inventor
EMIL HEMPEL
By
Attorney

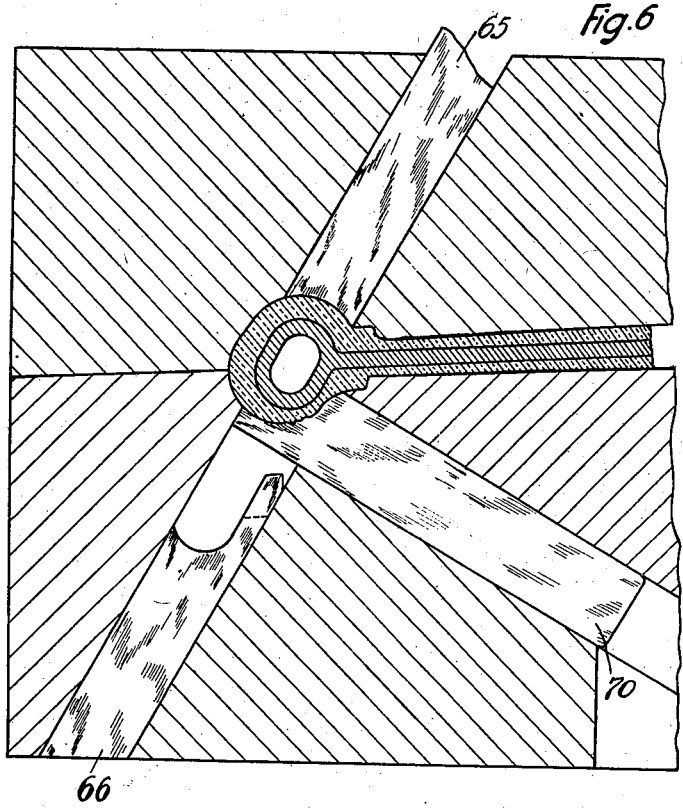
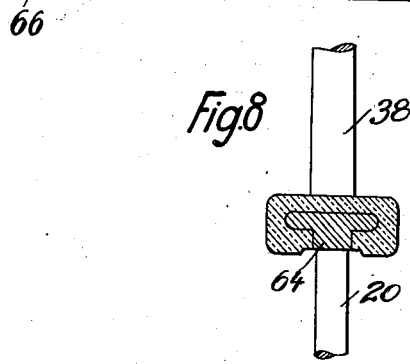
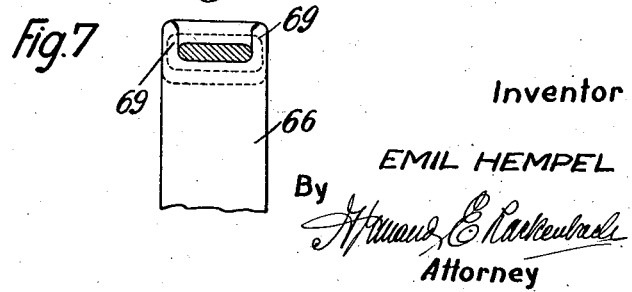

Aug. 22, 1944. E. HEMPEL 2,356,585
INJECTION MOLD
Filed Dec. 3, 1940 6 Sheets-Sheet 6
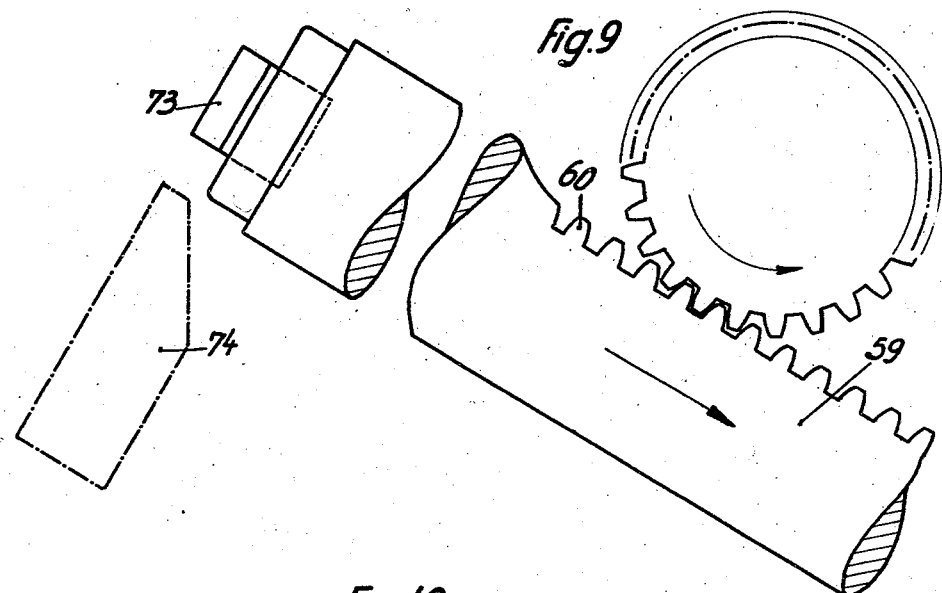
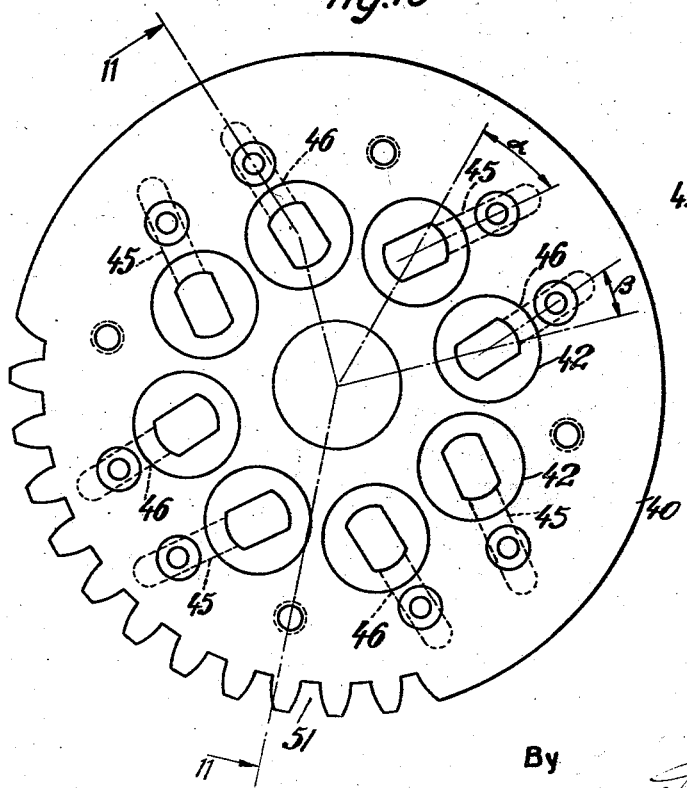
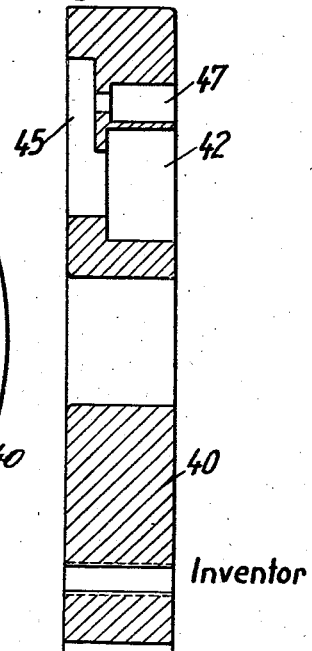
Inventor
EMIL HEMPEL
By
Attorney Patented Aug. 22, 1944

2,356,585

UNITED STATES PATENT OFFICE 2,356,585

INJECTION MOLD

Emil Hempel, Zerbst in Anhalt, Germany; vested in the Alien Property Custodian

Application December 3, 1940, Serial No. 368,312
In Germany November 23, 1939

14 Claims. (Cl. 18—42)

My invention relates to a mold for use in producing articles from a thermoplastic material.

The method of producing articles from thermoplastic material, such as cellulose acetate, styrol and the like, by the injection molding process has come into extended use in recent years. In this process, the material is introduced into an injection cylinder, is heated therein to plastic condition and is then injected under a high pressure into a mold to completely fill the cavity thereof. The mold is kept cold to quickly solidify the material therein and is composed of two or more sections which are then separated from each other, whereupon the finished article is ejected.

Numerous molding injection machines have been developed in which the steps of feeding the material to the injection cylinder, injecting the material into the mold, opening the mold, ejecting the finished article, closing the mold again and repeating this cycle of operations are carried out fully automatically. As the articles produced in this manner require little or no subsequent finishing treatment, this method is highly productive and comparatively inexpensive. However, the volume of the articles so produced is limited by a number of different conditions. Thus, the maximum pressure that may be produced by the injecting mechanism sets definite limits to the quantity of material that may be injected into the mold. Also, the capacity of the injection cylinder and the amount of heat applicable by the heating cylinder to the material within a reasonable time interval limit the volume of the work pieces.

It is an object of my invention to enable the manufacture of work pieces of a volume exceeding the capacity of the injection cylinder.

A typical example illustrating the importance of this problem is the manufacture of steering wheels of automobiles by means of the injection molding process. The volume of a steering wheel of ordinary dimensions considerably exceeds the capacity of the injection molding machines available on the market. It has been proposed to provide the steering wheel with a metal core structure comprising an annular rim member, a hub member and radial spoke members. This core structure fills up a substantial part of the mold cavity thus considerably reducing the quantity of thermoplastic material to be injected in order to form a mantle or coat covering the core structure. Nevertheless, the quantity to be injected exceeds the capacity of the machines available on the market.

It has been proposed to equip a molding machine with a plurality of injecting cylinders operating on one and the same mold simultaneously. In this way, the space surrounding the core structure could be properly filled, but the difficulty would arise that the comparatively flexible core structure would be liable to be deformed under the pressure of the injected material acting at different points of the core structure with different forces. As a result of such deformation, the core structure would be displaced relative to the walls of the cavity rendering the surrounding coat of thermoplastic material irregular and contacting perhaps with the wall of the cavity at some points leaving the core structure uncovered at such points. More particularly, it has been proposed to support the core structure by inserts of thermoplastic material placed in the mold but experience has shown that such inserts are incapable of resisting the shock action exerted thereupon by the injected material and are swept away thereby.

Among the objects of my invention is to develop a mold, whereby the core structure can be securely held in position, so that it will not be displaced by the stream of thermoplastic material injected at a very high pressure. To this end, I provide the core structure in a first injecting step in one or more molds with a plurality of spaced coats at the same time supporting the core structure at the points located between these coats. After these coats have been solidified, I provide the core structure in a second injecting step with complementary coats at the points where it was supported holding it in its position within the mold by means of the coats formed in the first injecting step. Preferably, I accomplish the two injecting steps in one and the same mold supporting the core structure in the first injecting step by removable core supports. The quantities of material which are successively injected into the mold in the two injecting steps are firmly welded together to constitute a homogeneous product.

The proposal to fill a single mold from a single injection cylinder by a plurality of injections closely succeeding each other is not novel. But this process offers considerable difficulties as the quantity of material first injected into the mold may spread therein in an uncontrollable manner and may form a spongy and porous lump of material which solidifies more or less before the second injection takes place. When this lump is set under pressure by the material injected in the second step, it will resist the compression and keep its porous character. It is a further object of my invention to avoid this disadvantage, particularly, when steering wheels for motor vehicles are to be produced in the manner above described.

To this end, I subdivide the cavity of the mold into a plurality of sealed compartments by partition elements which may be preferably removed without opening the mold. I first inject the material into one of these compartments completely filling the same thus subjecting the injected material to the full injection pressure securing a high-grade quality of the material solidifying in this compartment. Then, the partition element separating this compartment from the next one is removed, for instance, withdrawn from the mold cavity through a bore intersecting the same. Then, material is injected into the neighbouring compartment. This material will also completely fill the compartment and will be firmly welded to that injected into the first compartment constituting a unitary homogeneous work piece therewith. As each of the compartments is sealed and does not exceed the injection capacity of the machine, it is completely filled under pressure thus preventing the injected material from becoming spongy. In this way, I may build up comparatively large work pieces with or without any metal core structure step by step.

The method above described in which the coat of thermoplastic material surrounding the core structure is built up in two steps could be practiced by using a single mold in which the core supporting elements have been inserted. In this event, the mold would be opened after the first injection in order to remove the core supports. Then, the mold would be closed again and subjected to the second injection step. A further object of my invention is a valuable simplification of the operation by the provision of a mold from which the core supporting elements may be withdrawn without opening the mold.

Preferably, the mold is so designed that a core supporting element constitutes at the same time a partition element having the function above described. In this manner, I may combine the advantage of subdivision of the mold cavities into a plurality of sealed compartments with the advantages flowing from the use of a core structure and of the means supporting the same. Preferably, I provide the mold with separate injection ducts or sets of ducts for the successive injections. In this way, the material injected in the first step filling the duct or the set of ducts used therein may be allowed to solidify, since another duct or set of ducts is available for the second injection. In this way, the necessity of providing the mold with heating means for the injection ducts is eliminated.

My improved method entails the further problem of successively connecting the same injection cylinder with the various injection ducts of the mold or, more specifically, to connect the same set of injection nozzles successively with different sets of injection conduits. I may solve this problem by shifting the mold relative to the injection cylinder so as to bring the mouths of its ducts successively into registry with the injection nozzle or nozzles of the cylinder. A displacement of the large mold, however, requires cumbersome and expensive equipment. I therefore prefer to provide the mold with a valve which is operative in the consecutive injection steps to connect the cylinder successively with the different injection ducts of the mold. If I employ a cylinder having a set of injection nozzles distributed over a circle, I arrange the valve coaxially to the injection cylinder and provide the valve with different conduits for its different positions.

As the valve is seated on the mold the question arises of how to remove the plugs of solidified material left in its conduits and it is a further object of my invention to provide means for solving this problem. To this end, I provide ejectors adapted to eject these plugs into pockets provided in the mold and adapted to be discharged when the same is opened.

The object of rendering the partition elements or core supporting elements removable from the cavity of the mold may be attained in different ways. I prefer, however, to construct these elements as slides movable within bores intersecting the mold cavity. These slides may have a front face profiled in conformity with the contour of the cavity or they may cooperate with separate slides sealing their guide ways from the cavity when they are in retracted condition. In this event, the sealing slides have front faces conforming to the contour of the mold cavity.

When applying my invention to the manufacture of a steering wheel provided with spokes, I prefer to arrange the core supporting slides at the junctions of the rim of the wheel with its spokes. In this way, I may support the core structure very rigidly by a comparatively small number of supporting slides and, at the same time, may subdivide the mold cavity into a comparatively large number of sealed compartments. Moreover, I design the mold in such a way that the valve coaxially arranged thereon will successively connect the injection cylinder with a first set of ducts communicating with the rim sections and with a second set of ducts communicating with the spoke cavities.

I shall now describe a preferred embodiment of my invention in its application to the manufacture of a steering wheel with reference to the accompanying drawings.

Figure 2:
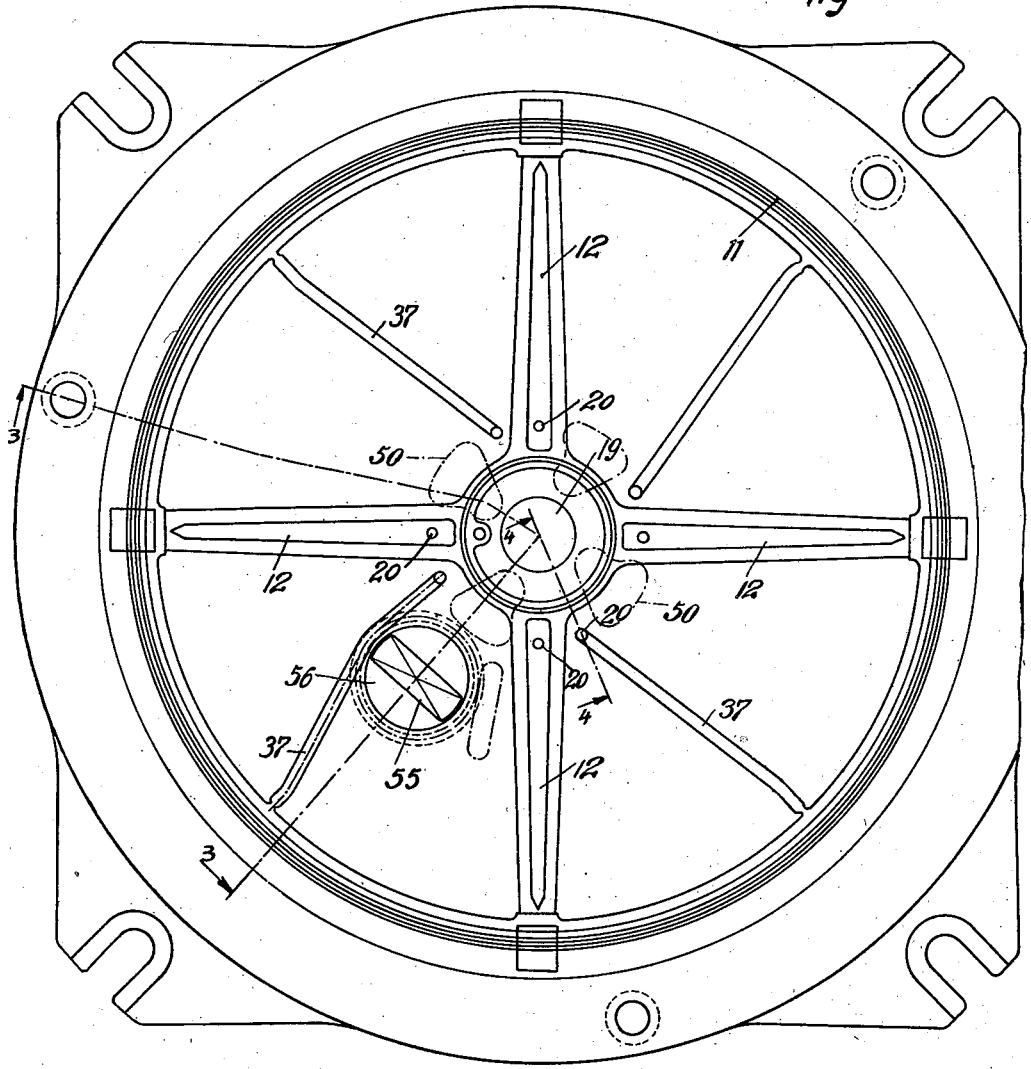
Figure 3:
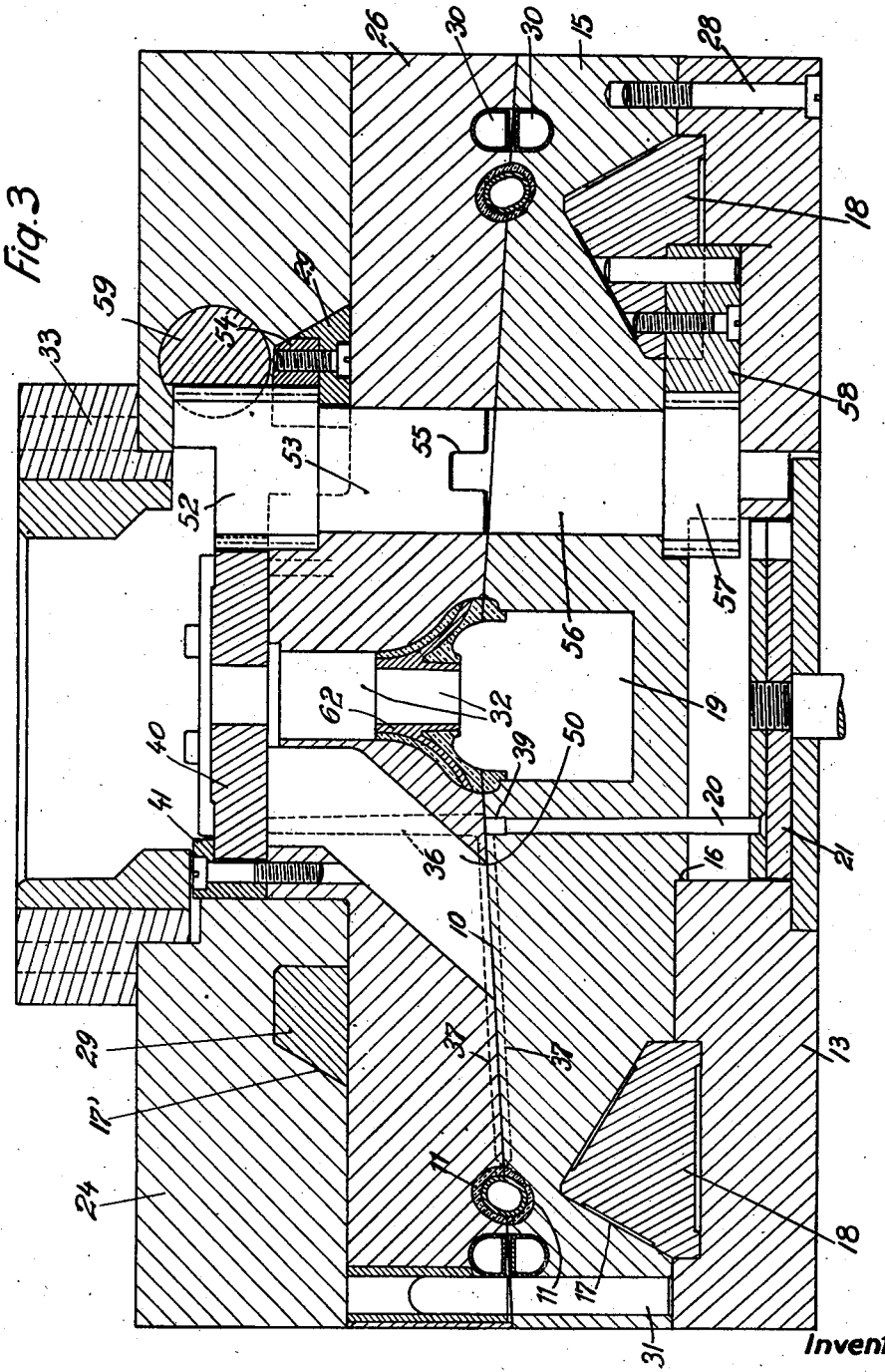
Figure 4:
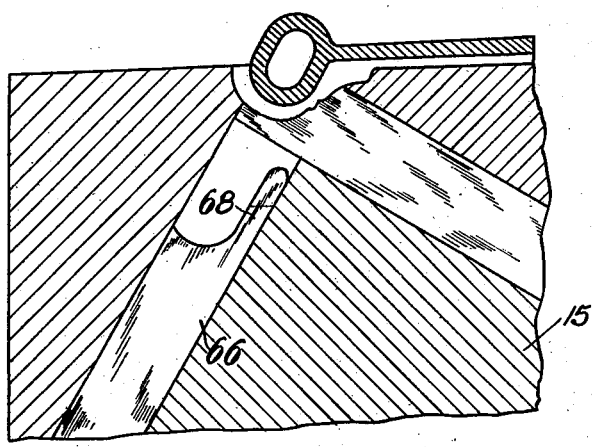
Figure 5:
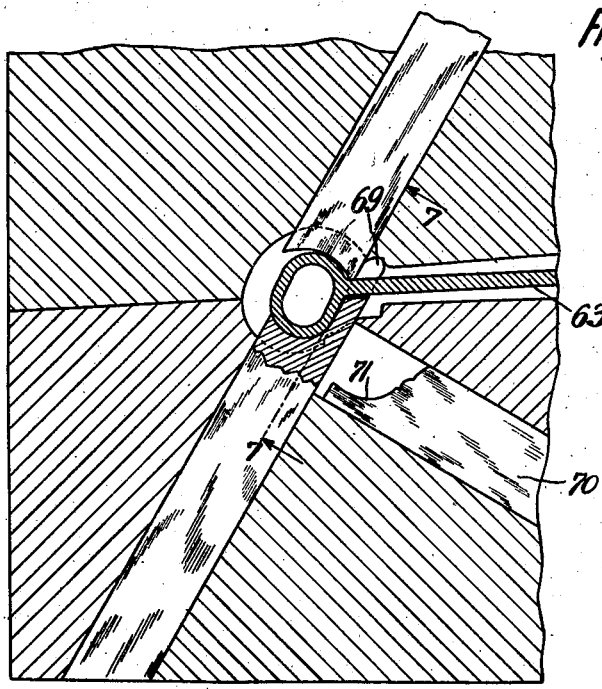

Fig. 1 is a cross-section through the mold in position after completion of the second injection, the core supports being withdrawn, Fig. 2 is a plan view of the lower form section, Fig. 3 is another cross-section through the mold taken along line 3—3 of Fig. 2, Fig. 4 is a partial section through the lower mold section and through the core structure inserted therein, the supporting slides being in retracted position, Fig. 5 is a view similar to that of Fig. 4 showing the core supports in projected position, Fig. 6 is an illustration similar to that of Fig. 5 of the elements after the retraction of the core supports and after the second injection, Fig. 7 is the section taken along line 7—7 of Fig. 5, Fig. 8 is the section taken along line 8—8 of Fig. 1, Fig. 9 is a partial plan view of the actuating mechanism shown in the right-hand top corner of Fig. 3, Fig. 10 represents a plan view of the valve, and Fig. 11 is the section taken along line 11—11 of Fig. 10.

The substantially cylindrical mold is divided along a slightly conical surface 10 extending transversely through the axis. The opposed faces of the two mold sections contain complementary annular recesses 11 cooperating to constitute the rim section of the mold cavity in which the rim of a steering wheel is molded, and complementary radial recesses 12 connecting the rim section with a central cavity provided for the hub of the steering wheel. In the radial recesses 12 the four spokes are molded.

The lower section of the mold shown in a plan view in Fig. 2 comprises an annular base plate 13 provided with lateral ears 14 for the attachment to the mold slide of the injection machine and a superimposed plate 15 having an annular shoulder 16 engaging the base plate 13. The elements 13 and 15 are firmly fixed to one another by screws 28 to constitute the lower mold section, the top of which is provided with the recesses 11 and 12 mentioned above. The bottom of the plate 15 is provided with an annular recess 17 having a substantially triangular cross-section, compare Fig. 3. In this recess, an annular cam member 18 is rotatably mounted between the two plates 13 and 15. This cam member serves to actuate the core supporting slides. Moreover, the plate 15 has a central recess accommodating a core member 19 contoured in conformity with the hub portion of the steering wheel to be produced.

The central opening of the plate 13 constitutes a cylinder in which a piston 21 is movable. This piston may be actuated by a piston rod 22 connected thereto and carries a plurality of ejecting stems 20. In Figs. 1 and 3 these elements assume their lower position in which the piston abuts against a cover 23 attached to the plate 13 by screws.

The upper section of the mold is of a similar design. It comprises an upper annular disc 24 and a lower disc 26 attached thereto by screws 27. They are held in accurate registry by a shoulder 25 provided on the disc 26 and engaging the disc 24. The two discs accommodate between them a coaxial cam ring 29 rotatably mounted within a recess 17' of the disc 24 and adapted to actuate core supporting slides.

The annular recesses 11 provided in the two mold sections constituting the rim cavity are surrounded by additional annular recesses in which pipes 30 are mounted through which cooling water is circulated keeping the mold in cold condition.

In order to hold the mold sections in accurate and rigid alignment, pins 31 are attached in the plate 15 and slidably engage registering bores of the disc 26 (Fig. 3).

In the central opening of the disc 26 a member 32 is inserted whose bottom face engages the member 19 when the mold is closed to confine the interior of the cavity in which the hub of the work piece is molded.

In Figs. 1 and 3 I have shown the mold in closed position in which its contacting sections are firmly pressed upon one another by the form slide of the machine indicated at 33 and in which the injection nozzles 35 mounted on the injection cylinder 34 engage the valve member of the mold to inject the material into the latter. In the present embodiment, the injection cylinder is provided with four nozzles distributed about the axis of the injection cylinder.

I have provided two sets of ducts to connect the valve member with the mold cavity. One set is constituted by complementary grooves 37 (Figs. 2 and 3) provided in the contacting faces of the mold cavity extending from vertical bores 36 of the disc 26 radially in outward direction and opening into the rim cavity of the mold at points located between the spoke cavities. Accordingly, there are four such ducts including four bores 36. These bores 36 are axially aligned with four ejector stems 20.

The second set of ducts comprises four bores 38 directly opening into the spoke cavities. The bores 36 and 38 extending in parallel relationship and at equal distances from the axis of the mold slightly taper downwardly in order to permit the plugs of solidified material formed therein to withdraw from the upper mold section when the same is lifted. In order to ensure that these plugs will stick to the lower section, when the upper section is lifted, I have provided downwardly tapering recesses 39 in the plate 15 below the bores 36 and above the ejecting stems 20, as shown in Fig. 3. The feet which will form in these recesses 39 will safely anchor the plugs of material to the lower section. After the lifting of the upper section the ejector piston 21 is raised and causes the stems 20 to break off the waste members formed in the ducts 36 and 37 from solidified material.

According to a feature of my invention the two sets of ducts 36 and 38 are successively fed with material in the two consecutive injecting operations and, for this purpose, are successively brought to communication with the injection nozzles 35 by means of a valve.

This valve comprises a circular plate 40 illustrated in Figs. 10 and 11. It is rotatably seated on the central portion of the disc 26 and is kept in position thereon by an annular gib 41 attached to the disc 21 by screws, as shown in Fig. 1.

Eight circular holes 42 are provided in the top of the plate 40. In these holes, sleeves 43 are inserted which are provided with collars and are retained in the openings 42 by a cover plate 44 attached to the plate 40 by screws. From four of the openings 42, conduits 45 extend outwardly at an angle α to the radius. Each of these conduits 45 is formed by a groove in the bottom face of the plate 40. From each of the other four openings 42 similar conduits 46 extend outwardly at an angle β to the radius. The thermoplastic material is injected by the injection nozzles into the sleeves 43 and flows through the conduits 45 and 46 to the mouths of the ducts 36, or 38 respectively.

As mentioned above, the injecting cylinder is provided with four nozzles 35. In the first injecting operation the plate 40 is rotated to a position in which the conduits 46 may communicate with the nozzles. In this operation, the conduits 46 communicate with the ducts 36 so that the thermoplastic material will be fed to the sections of the rim cavity located between the spoke cavities. Upon completion of the first injecting operation, the mold is lowered and withdrawn from the injection nozzles and then the valve plate 40 is rotated to a position in which the conduits 45 may communicate with the nozzles, whereupon the second injection operation follows. In this operation, the material is fed by the conduits 45 and the ducts 38 to the spoke cavity of the mold filling the same completely.

As shown in Figs. 10 and 11, the plate 40 is furthermore provided with eight bores 47 communicating with the outer ends of the conduits 45 and 46 and serving to guide ejection stems 48 (Fig. 1). These stems are provided with collars and are surrounded by helical springs bearing on these collars and tending to keep the stems in raised position.

Whenever a partial rotation is imparted to the plate 40, a cam mounted on the injection cylinder in position above the ejector stems will engage and press the same downwardly. The cam faces are provided on a ring 49 shown in Fig. 1. The ejector stems 48 serve the purpose of ejecting the plugs of solidified material which will form in the conduits 45 and the sleeves 43. This ejecting operation, however, is conditional upon the presence of a free space provided below the plugs. Therefore, the central portion of the mold below the valve 40 is provided with pockets 50, the upper ends of which are flaring to receive the ejected plug of thermoplastic material. The pockets are formed by openings extending through the plate 26. When the mold is opened by lowering its lower section, the plugs of material will drop out of the pockets 50 and may then be removed.

From the foregoing explanation it will be understood that the valve 40 has the function of alternately connecting the set of nozzles 35 with the two sets of ducts 36 and 38. Therefore, the valve member 40 must be turned after any injection operation. For this purpose, it is provided with peripheral spur gear teeth 51 meshing with a pinion 52. This pinion serves at the same time to drive the annular cam 29 and, for this purpose, meshes with a toothed segment 54 (Fig. 3) attached to the cam by screws. The pinion 52 and a stub shaft 53 integral therewith are journalled in a bore of the discs 26 and 27. The stub shaft 53 is provided with clutch teeth 55 for cooperative connection with a stub shaft 56 integral with a second gear 57 and journalled in registering bores of the plate 15. The gear 57 serves to drive the annular cam 18 and, for this purpose, engages a toothed segment 58 attached to the cam 18 by screws. The disc 24 of the upper mold section has a horizontal bore constituting a guide way for a slidable rod 59 provided with rack teeth 60 meshing with the pinion 52. When the rod 59 is shifted in its guide way, it will drive the two gears 52 and 57 which, in their turn, rotate the valve 40 and the annular cams 18 and 29. The clutch teeth 55 permit the removal of the two mold sections from one another and connect the two stub shafts, when the mold is closed.

The core structure of the work piece to be produced comprises an annular tube 61 of a light metal, a central bushing 62 and four spoke members 63 interconnecting the same. These elements are firmly welded together. Moreover, the spoke members 63 have lower projections 64 located opposite the points where the ducts 38 open into the spoke cavities. These projections 64 rest on the bottoms of the grooves 12 of the lower form section and thus maintain the members 63 in position against the impact of the material injected through the ducts 38.

However, these supports 64 are too far spaced from the rim member 61 to keep the same centered within the rim cavity. Therefore, the rim cavity is held by special core supports during the first injection operation in which the major portion of the rim cavity is filled by the material fed through the ducts 37. These special supports prevent the material entering the cavity under a high pressure and impacting upon the core member 61 from displacing the same.

The special core supports engage the core member 61 at the junctions thereof with the spoke members 63. Since the sets of supporting means provided at the four junctions are similar it will suffice to describe one of these sets. This set comprises two slides 65 and 66 slidably guided in bores of the upper and the lower form section. These bores extend within radial planes of the mold in inclined direction and intersect the recesses 17 and 17'. The slides 65 and 66 have lateral studs 67 engaging cam slots provided in the annular cams 18 and 29. When these cams are rotated, the cam slots will displace the slides 65 and 66 within their guide way.

As shown in Fig. 4, the core supporting member 66 is provided with a projecting bifurcated finger 68, see Fig. 7. The two bifurcations 69 straddle the spoke member 63 when the slide assumes its upper projected position and constitutes a partition substantially separating the spoke cavity 12 from the rim cavity 11. The separation of these two cavities is completed by the upper slide 65, the lower end of which assumes a position in front of and in contact with the bifurcations 69 and with the spoke member 63, when projected into the mold cavity. In this manner, the core supports 65 and 66 cooperate to constitute a partition completely sealing the rim cavity from the spoke cavity of the mold. At the same time, the two supports engage the rim core member 61 from opposite sides firmly clamping it between them and holding it rigidly in centered position.

From the above description it will be understood that the members 65 and 66 serve the dual function of supporting the core of the work piece and maintaining it in centered position against the impact of the first injection and of subdividing the whole cavity into a plurality of separate compartments which may be successively filled, each compartment having a volume not exceeding the capacity of the injection cylinder and being, therefore, adapted to be completely filled under pressure ensuring the desired density of the finished product.

After the first injection in which the nozzles are put by the valve 40 into communication with the ducts 37 and in which the core member 61 is coated with thermoplastic material between the core supporting points, the core supports 65 and 66 are withdrawn from the mold cavity and are retracted into the position shown in Fig. 6.

It will be observed that the front face of each core support 65 is so shaped as to conform with the profile of the mold cavity and as to be flush therewith when in retracted position. The lower slide 66, however, cannot be so shaped as it must be provided with the bifurcated finger 69.

For this reason, a special sealing member 70 adapted to seal the guide way of the slide 66 is provided. This sealing member is slidably mounted in a bore extending at a right angle to the slide 66 and its front face 71 is profiled in conformity with the contours of the mold cavity. When the slides 66 are retracted, the sealing slides 70 are at the same time projected into the position shown in Fig. 6 in which they seal the guide ways of the slides 66. The sealing slides are actuated by the annular cam 18 and, for this purpose, are provided with studs 72 engaging cam slots provided in the cam 18.

The operation of the mold is the following:

First, the core structure 61, 62, 63 is placed in position upon the lower mold section and then the latter is raised into contact with the upper mold section to close the mold. Then, the rack 59 is shifted towards the right with reference to Fig. 9 either manually or by suitable mechanical means (not shown), whereby the core supports are moved to operative positions and the valve 40 is set. Then, the first injection takes place.

In this injection, the heated material issuing from the nozzles 35 flows through the conduits 46 of the valve 40 and through the ducts 36, 37 entering the rim cavity of the mold at four equidistant points thus filling the rim cavity except for the spaces thereof that are occupied by the projected core supports. The rim cavity is sealed from the spoke cavities 12 by the supporting members 65 and 66. Therefore, the material injected therein may be maintained under the high injection pressure exerted by the injection piston of the machine until the injected material will have solidified. In this way, a compact and dense structure of the coat produced on the core member 61 is ensured. Obviously, the maintenance of pressure on the injected material would not be possible, if the material could leak out from the rim cavity into the spoke cavities. Hence, the subdivision of the mold cavity into separate compartments is an important feature of my invention.

When the material has sufficiently solidified, the injection piston of the machine is withdrawn and the mold is slightly lowered in order to withdraw the sleeves 43 from the nozzles 35. Then, the rack 59 is moved towards the left to actuate the cam for retraction of the core supports 65 and 66, for projection of the sealing slides 70 to the position shown in Fig. 6, and for partial rotation of the valve 70 into a position in which the conduits 45 will get into registry with the nozzles 35 and into communication with the ducts 38. During the rotation of the valve 40 the plugs of solidified material formed in the conduits 46 are sheared off the plugs formed in the bores 36 and arrive in position above the pockets 50 to be downwardly ejected into the same by the ejecting stems 48.

It will be understood that the conduits 45 and the ducts 38 are still in empty condition.

Now, the mold is raised again to be firmly pressed against the nozzles 35 whereupon the second injecting operation follows, in which the material is fed through the ducts 38 into the spoke cavities 12 and flows through the same into the spaces which, in the first injection step, were occupied by the core support 65 and 66. In these spaces which are now completely filled, the injected material will form supplemental coats surrounding the core structure at the points where it was formerly supported. These supplemental coats will weld together with the solidified coats to constitute a homogeneous uniform coat completely surrounding the core member 61. In this second injecting operation, the solidified coats formed in the first injecting process will hold the core member 61 rigidly in centered position within the mold cavity while the core supports 65 and 66 are withdrawn.

After the material has sufficiently solidified, the mold slide 33 carrying the mold is lowered and the rack 59 is restored to initial position. This may be done manually or by suitable mechanical means, such as a stationary cam 74, Fig. 9, with which a projection 73 of the rack 59 will engage. The restoration of the rack 59 imparts a partial rotation to the valve 40, whereby the plugs of material solidified in the conduits 45 are sheared off the plugs formed in the ducts 38. Then, the mold is opened and the ejector piston 21 is raised. Four ejector stems 20 thereof will engage the projections 64 of the core structure and will lift the finished work piece out of the lower mold section. The other four ejector stems serve the purpose of breaking the waste member formed in the ducts 37 and 36 from the lifted work piece.

When the upper mold section is lifted from the lower one being guided relative thereto by the alignment pins 31, the plugs of material formed in the ducts 36 and 39 may adhere to the work piece, as these ducts taper downwardly to a slight degree and since these plugs have been sheared from the plugs left in the valve member 40 by the preceding rotation thereof.

Before the cycle of operations is repeated, the rack 59 is completely drawn towards the right rotating the valve 40 to a position in which the plugs left in the conduits 45 are positioned above the pockets 50 and are ejected by the stems 48 into these pockets.

While I have described my invention with reference to a specific embodiment thereof, I wish it to be understood that it is capable of numerous modifications within the scope of the appended claims. While I prefer to produce the work piece by two successive injecting operations, occasions may arise where a larger number of consecutive injecting operations is desirable. Nor is my invention limited to the use of the same mold for the stepwise completion of the work piece as a number of different molds may be used in the successive injecting operations.

When my invention is applied to work pieces other than steering wheels which do not require a core, it may nevertheless be preferable to subdivide the mold cavity into a plurality of separate compartments by retractable slides using a valve in the described manner to fill these compartments successively through separate ducts. On the other hand, I may produce work pieces provided with a core structure by the use of retractable supporting members which do not subdivide the cavity of the mold. In this event, the mold must be completely filled by the first injection, the second injection serving the sole purpose of filling the spaces left by the retraction of the core supports.

When the steering wheel to be produced is of the type in which the spokes are formed by metal rods not coated with thermoplastic material, the grooves 12 are made as narrow as the grooves 37 thus constituting mere continuations of the ducts 38 opening into the rim cavity in proximity of the core supports to feed the material to the required points during the second injection.

What I claim is:

1. In an injection molding machine, a two-part mold having a plurality of injection ducts, a plurality of inwardly projecting removable partition elements subdividing the cavity of the mold into a plurality of compartments separate from each other, each compartment communicating with at least one of the injection ducts provided in said mold.

2. In an injection molding machine, a two-part mold having a plurality of injection ducts, a plurality of inwardly projecting removable partition elements subdividing the cavity of the mold into a plurality of compartments separate from each other, each compartment communicating with at least one of the injection ducts provided in said mold, and means movably guided within said mold for withdrawing said partition elements from the cavity of said mold without opening the same.

3. In an injection molding machine, a two-part mold having a plurality of injection ducts, inwardly projecting removable core supporting partitions, and means movably mounted in said mold for removing said supporting partitions from the cavity of said mold, said injection ducts opening into said cavity in the proximity of said core supporting partitions.

4. In an injection molding machine, a two-part mold having a chambered cavity and separate injection-ducts for the chambers, core supporting partitions movable into the cavity of the mold to separate the chambers, and means movably mounted in said mold for removing said partitions from the cavity of said mold, certain of said injection ducts communicating with said cavity at points located between said partitions for injecting material filling said cavity while said partitions are in operative position, and other injection ducts opening into said cavity in the proximity of said partitions for supplying material to the spaces left by said partitions upon their removal.

5. In an injection molding machine, a two-part mold having a chambered cavity to receive a core and separate injection ducts for the chambers, core supporting partitions movable into the cavity of the mold and shaped to subdivide the space left by said core into a plurality of chambers sealed from each other, and means movably mounted in said mold for removing said partitions from the cavity of said mold, certain of said injection ducts communicating with said chambers for injecting material into the same and other injection ducts opening into a cavity in the proximity of said partitions for supplying material to the spaces left by said partitions upon their removal.

6. In an injection molding machine, a two-part mold having a chambered cavity and separate injection ducts for the chambers, core supporting partitions movable into the cavity of the mold and shaped to subdivide the space left by said core into a plurality of chambers sealed from each other, means movably mounted in said mold for removing said supports from the cavity of said mold, certain of said injection ducts communicating with said chambers for injecting material into the same and other injection ducts opening into said cavity in the proximity of said partitions for supplying material to the spaces left by said supports upon their removal, and means for injecting thermoplastic material first into said injection ducts and subsequently upon removal of said partitions into said other ducts.

7. In an injection molding machine, a two-part mold having a chambered cavity and separate injection ducts for the chambers, core supporting partitions movable into the cavity of the mold and shaped to subdivide the space left by said core into a plurality of chambers sealed from each other, means movably mounted in said mold for removing said partitions from the cavity of said mold, certain of said injection ducts communicating with said chambers for injecting material into the same and other injection ducts opening into said cavity in the proximity of said partitions for supplying material to the spaces left by said partitions upon their removal, means for injecting thermoplastic material and a valve member connecting said means first with said injection ducts and subsequently with said other ducts.

8. In an injection molding machine, a two-part mold having a chambered cavity and separate injection ducts for the chambers, core supporting partitions movable into the cavity of the mold and shaped to subdivide the space left by said core into a plurality of chambers sealed from each other, means movably mounted in said mold for removing said partitions from the cavity of said mold, certain of said injection ducts communicating with said chambers for injecting material into the same and other injection ducts opening into said cavity in the proximity of said partitions for supplying material to the spaces left by said partitions upon their removal, means for injecting thermoplastic material and a valve member connecting said means first with said first named injection ducts and subsequently with said other ducts, and common driving means actuating said valve and said partition removing means.

9. In an injection molding machine, in combination, a mold part having a molding cavity on one side and having the opposite side forming a valve seat, a plurality of series of injection ducts connecting spaced points in the molding cavity with the valve seat, a series of pockets in the mold part intermediate the injection ducts, a valve element rotatably mounted on the valve seat and provided with a series of conduits, means for injecting thermoplastic material through said valve conduits to each series of injection ducts in succession, ejectors carried by the valve and means for actuating said ejectors to eject solidified plastic material from the conduits into said pockets.

10. A mold for injection molding machines having a cavity, a first bore intersecting the same, a second bore intersecting the junction of said bore with said cavity, a core-supporting member slidably guided in said first bore and a sealing member guided in said second bore for sliding movement into advanced position within the cavity and, when in advanced position, obstructing said first bore and having a front face shaped to constitute a continuation of the walls of said cavity, and driving means engaging said core supporting member and said sealing member and alternatively projecting one of said members into and simultaneously retracting the other one of said members out of said cavity.

11. A mold for a steering wheel provided with a rim cavity, a hub cavity and interconnecting spoke cavities, bores intersecting the junctions of said rim cavity and said spoke cavities, core supports slidable in said bores, and means engaging said supports projecting the same into said cavities and withdrawing the same therefrom.

12. A mold for injection molding machines including core supports movable into and out of the mold cavity, means movably mounted in said mold for withdrawing said supports from the cavity of said mold, said mold being provided with two sets of injection ducts, the first set opening into adjacent cavity at points located between said core supports for delivering thermoplastic material into said cavity, while said core supports hold a core in fixed floating position therein, the second set of said ducts opening into said cavity in proximity of said core supports for delivering material into the spaces left by said supports upon their removal, a valve member, means connected thereto for injecting thermoplastic material successively through said sets of ducts, and common driving means actuating said valve and said support withdrawing means.

13. A mold for a steering wheel comprising a rim cavity, a hub cavity and interconnecting spoke cavities, bores intersecting the junctions of said rim cavity and said spoke cavities, core supports slidable in said bores into and out of said junctions, an annular cam rotatably carried by said mold for engaging and shifting said core supports, two sets of ducts, the first set communicating with said rim cavity and the second set communicating with said spoke cavities, a valve member rotatably mounted on said mold, means connected thereto for injecting thermoplastic material through said two sets of ducts in succession, and gearing interconnecting said valve with said annular cam.

14. A mold for a steering wheel comprising a rim cavity, a hub cavity and interconnecting spoke cavities, bores intersecting the junctions of said rim cavity and said spoke cavities, core supports slidable in said bores into and out of said junctions, an annular cam rotatably carried by said mold for engaging and shifting said core supports, two sets of ducts, the first set communicating with said rim cavity and the second set of ducts communicating with said spoke cavities, a toothed valve member rotatably mounted on said mold, means connected thereto for injecting thermoplastic material through said two sets of ducts in succession, a shaft journalled in said mold and extending parallel to the axis of said hub cavity and of said rim cavity, and provided with two gears, one gear engaging said toothed valve member and the other gear engaging said annular cam.

EMIL HEMPEL.